United States Patent [19]

Schiemann

[11] Patent Number: 4,844,486

[45] Date of Patent: Jul. 4, 1989

[54] BELLOWS FOR MOTOR VEHICLE

[76] Inventor: Wolfram Schiemann, Eugen-Nagele-Strasse 17, D-7140 Ludwigsburg, Fed. Rep. of Germany

[21] Appl. No.: 121,932

[22] Filed: Nov. 18, 1987

[30] Foreign Application Priority Data

Nov. 18, 1986 [DE] Fed. Rep. of Germany ....... 3639482

[51] Int. Cl.$^4$ ........................... F16J 3/04; F16J 15/52
[52] U.S. Cl. .............................. 277/212 FB; 464/175
[58] Field of Search .......................... 277/94, 212 FB; 464/175; 180/140, 148; 74/18.1, 18.2

[56] References Cited

U.S. PATENT DOCUMENTS

| 1,922,431 | 8/1933 | Geyer | 464/175 |
| 3,830,083 | 8/1974 | Hadick et al. | 464/175 |
| 4,309,063 | 1/1982 | Weis | 277/94 X |
| 4,558,869 | 12/1985 | Grove et al. | 277/212 FB X |
| 4,639,159 | 1/1987 | Amrath | 74/18.2 X |
| 4,730,834 | 3/1988 | Ukai et al. | 277/212 FB |

Primary Examiner—Donald A. Griffin
Attorney, Agent, or Firm—M. Kestenbaum

[57] ABSTRACT

An oil and grease-proof bellows for enclosing joints on axles of motor vehicles is produced from thin thermoplastic elastomers using hollow body production techniques. The bellows has a relatively small diameter collar, a collar of relatively large diameter, and a bellows device disposed between the collars, with an inner envelope and an outer envelope that decreases in diameter towards the smaller diameter collar. At least one bellows rib extends spirally from one collar to the other.

8 Claims, 2 Drawing Sheets

BELLOWS FOR MOTOR VEHICLE

The invention relates to a bellows for enclosing joints on axles of motor vehicles.

BACKGROUND OF THE INVENTION

Such bellows is produced from thin thermoplastic elastomers using hollow body production techniques. Such bellows has a relatively small diameter collar, a relatively large diameter collar and a bellows device disposed between these collars, with an inner envelope and an outer envelope that decreases in diameter towards the smaller diameter collar.

Such bellows are used above all in passenger vehicles. The material is not rubber but a material of the Hytrel type (registered trademark of Dupont). The walls of the bellows are thin. In their magnitude, they weight 80 to 90 grams. If such a bellows were to be made from rubber, then it would weigh, for instance, 140 g. The material used is expensive. It costs 18 DM per kg. It is true that rubber would be cheaper, but it would not satisfy the demands in the same way. The demands are numerous in many directions: the steering deflection on the front wheel axle amounts to 43 to 46 degrees. The bellows must follow this steering deflection. This is also true when the vehicle is moving. Then, the tendency of bellows is no longer to return to their original position, being to a certain extent pretensioned in the wrong direction. The axles of passenger cars can turn at 1500 r.p.m. The bellows have also to perform the steering turn-in as well as the speeds of revolution.

Also, the bellows provided on the gearbox—farther inwards—nevertheless have to withstand a spring travel of about 15 degrees.

From the temperature point of view, too, the bellows are subject to heavy loadings. They have to remain usable at temperatures from +140 degrees Celsius to −40 degrees Celsius. The −40 degrees C naturally comes from the outside temperature. The +140 degrees C comes from the fact that particularly where the inner bellows are concerned, the heat radiated from the engine is an important factor.

The bellows must also withstand the gravel test, in which gravel is shot at the bellows, in the same way as occurs, for example, when a vehicle is running on crushed chippings. Then, furthermore, the bellows has to withstand chemical loadings caused by grease and oil. Furthermore, the material must not flow when clips are applied to the smaller diameter collar and the larger diameter collar. The bellows must be of such a form that mass production is possible. At present, about five per minute can be produced in multiple molds.

On top of all this, the bellows must withstand considerable flexion work, and also when the bellows has been fitted with alignment errors which can never be entirely avoided. Although the bellows ought not to have any initial tension, when the steering lock is 0 degrees and when the spring travel is in the neutral range, installation errors nevertheless occur which will occasion initial tension anyway and a bellows must be capable of withstanding this too.

OBJECT AND STATEMENT OF THE INVENTION

The object of the invention is to provide a bellows which both combines all the hitherto enjoyed properties, sacrificing none of them, and also has a longer effective life, whether because there is less flexion work or whether the centrifugal forces are smaller because the mass is smaller, or whether it be that it cleans itself better or because the uniform thickness of the walls is better controlled.

According to the invention, this problem is resolved by having at least one bellows rib that extends spirally from one of the collars to the other. If the pitch of the spiral is selected the right way, then any grease will be constantly transported to the joint, for example even if it tends to run off when the vehicle is at an angle. With such a spiral there is, of course, a continuously extending spiral bottom and an equally continuously extending spiral rib. This continuity is advantageous from the most widely diverse points of view.

Advantageously, the invention includes the following additional features:

The length of the spiral bellows rib is shorter than the sum of the lengths of the bellows ribs of rotationally symmetrical comparable bellows devices. In particular, this feature means that flexion work is reduced because the total length of what is now the "single" crease is shorter than the overall length of the annular creases. In addition, weight is also saved, which is reflected in the costs and the reduced centrifugal force. Generally speaking, it can be said that a spiral bellows is also cleaned better.

This feature again minimizes the flexion work and less of the expensive material is required for production. Attention should be drawn to the fact that with mass-produced items, a saving in the percentage range is already an extraordinary fact because other properties are also improved.

The pitch of the spiral is less than 15 degrees. The spiral still folds up quite satisfactorily even with a considerable steering lock.

The pitch of the spiral is less than 10 degrees and greater than 2 degrees. The optimum range is described by this feature.

The pitch of the spiral is constant. This simplifies manufacture.

The pitch of the spiral diminishes towards the smaller diameter collar. As a result, the axles cuff becomes increasingly softer in relation to its possible degree of bend on steering lock, the closer one comes to the smaller diameter collar. this makes it possible for the cuff to adapt itself to the curvature when necessary. It further reduces the amount of flexion work. The restoring force is less.

The pitch of the spiral diminishes towards the larger diameter collar. By virtue of this feature, the bellows become softer in the area where bending of the bellows is intended to be at its greatest, according to whichever joint is to be protected.

The height of the bellow'srib is constant and becomes smaller only in the region of the collars. Simplification of production is thus provided for.

The height of the bellow'srib becomes smaller towards the smaller diameter collar. This makes it possible to better adapt to the bellow bending requirements, which provides yet a further advantage particularly when the pitch of the spiral becomes smaller in this area.

The height of the bellow'sribs becomes smaller towards the larger diameter collar. The same can be said of this feature if such behavior is required in the larger diameter collar.

The smaller diameter is followed by an approximately radial area and the spiral bellow'srib ends in the circumference of the radial area. A less disturbing run-out is provided for.

The bellows device has more than one of these bellow's ribs. This makes it possible to provide for greater degrees of pitch while nevertheless the bellows can be finely sub-divided.

DESCRIPTION OF THE DRAWINGS

The invention will now be described with reference to preferred embodiments shown in the accompanying drawings, in which.

DETAILS OF PREFERRED EMBODIMENTS

Figure 1:
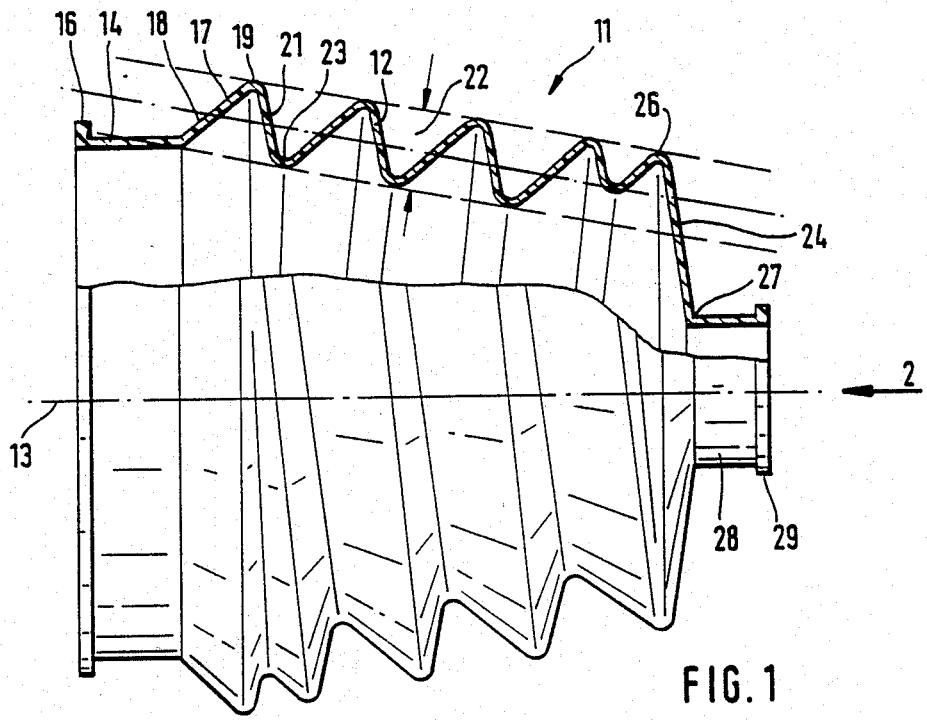
FIG. 1 is a side view of a partly broken-away bellows.
Figure 2:
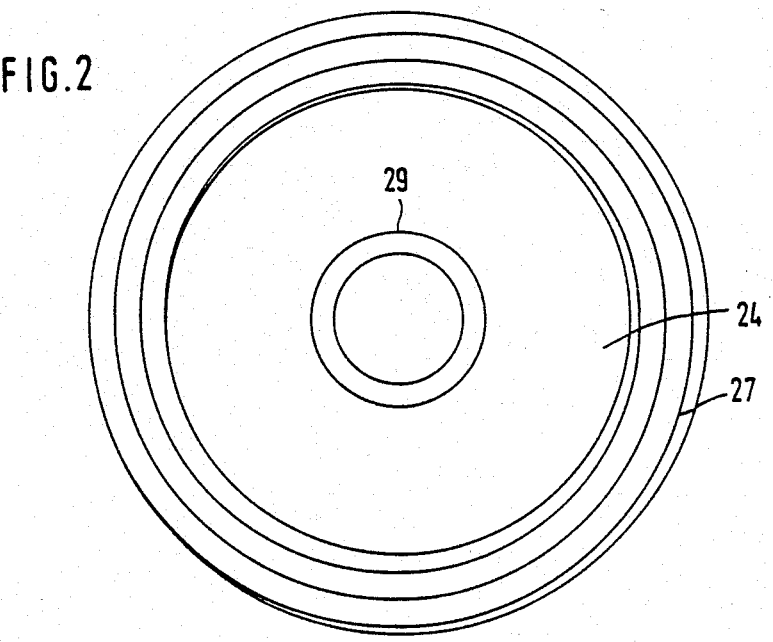
FIG. 2 is a view according to the arrow 2 in FIG. 1.

A bellows 11 has a wall thickness 12 of 1.4 mm and is blown from Hytrel (R) (registered trademark of Dupont). The bellows 11 has a geometrical longitudinal axis 13 which in operation is also the geometrical longitudinal axis of the axle provided on a vehicle. Naturally, this axle only coincides with the geometrical longitudinal axis 13 when the joint to be protected is in its neutral position. In this case, the bellows 11 is without tension. Provided on the left is a circularly-cylindrical collar 14 which is coaxial with the longitudinal axis 13 and which ends on the left in a terminal rib 16.

The inner periphery of the collar 14 fits into a corresponding but not shown projection on a vehicle, and if correctly installed there is on the collar 14 a clip so that this portion is fluid-tight. Extending rightwardly from the collar 14 is a spiral 17. This has a sawtooth profile with, commencing on the left, a shallower flank 18, which extends rectilinearly in the manner shown. This is followed buy a bellows ridge 19 of relatively large radius (2 to 3 mm) and this is in turn followed by a flank 21, which likewise extends substantially rectilinearly but substantially more steeply to the longitudinal axis 13. The angle of the flank 21 to the longitudinal axis 13 amounts to about 80 degrees, while the angle of the flank 18 is about 60 degrees.

The flank 21 extends downwardly into a bellows trough 23, which likewise has a relatively large radius. The bellows trough 23 is then followed by the next flank of that portion of the bellows rib which has run on through about 360 degrees and so on.

The amplitude 22 between bellows ridge 19 and bellows trough 23 is constant from the left-hand portion to the right and only becomes lower when the spiral 17 merges into an approximately radial end wall 24. This end wall is approximately as steep as the flank 21, also for reasons of mold removal.

In FIG. 1, if one proceeds from the left rightwardly, then after 360 degrees, the bellows trough 23 has reached its final depth and at about 360 degrees before the end wall 24, the bellows trough rises again so that bellows trouch 23 and bellows ridge 19 (as also in the left-hand region) meet again and merge into the outer curvature 26 of the end wall 24.

After a sharp angle 27 of about 100 degrees, the end wall 24 merges into a collar 28 of smaller diameter which is disposed circularly and coaxially of the longitudinal axis 13. It ends on the right in a terminal rib 29 so that a fixing clip located there cannot slip off.

If the front wheels are turned to maximum lock and the vehicle travels, then the spiral acquires its shape. In this case, the flanks 18, 19 flex and rest on one another, in fact not only loosely but with the application of pressure. On the opposite side, the spiral is correspondingly expanded, i.e. is virtually fully stretched.

This stressing instance occurs when the bellows bridges those joints of the axle which are close to the wheel. From the point of view of deformation, the bellows close to the engine does indeed have an easier time but is subjected to the heat radiated from the engine.

Figure 3:
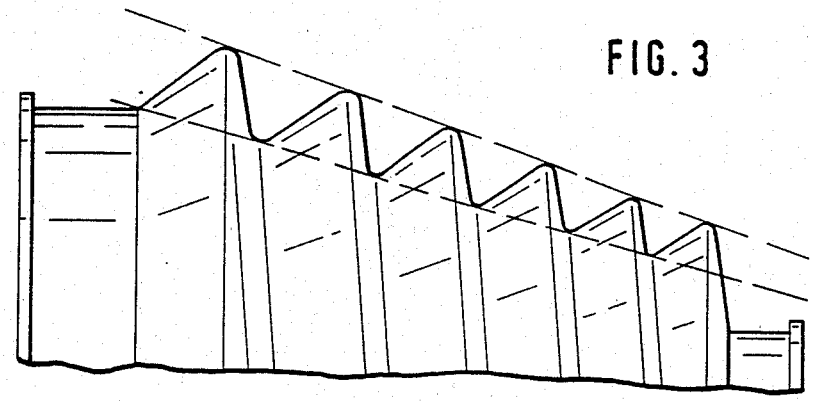
FIG. 3 is a view similar to FIG. 1 but of a second embodiment.

As can be seen from FIG. 3, in this example, the amplitude of the spiral diminishes rightwardly and the frequency increases. This means that the bellows becomes more flexible rightwardly and that also more flank length is available per length of geometrical longitudinal axis 13, which under difficult conditions facilitates adaptation of the bellows.

Figure 4:
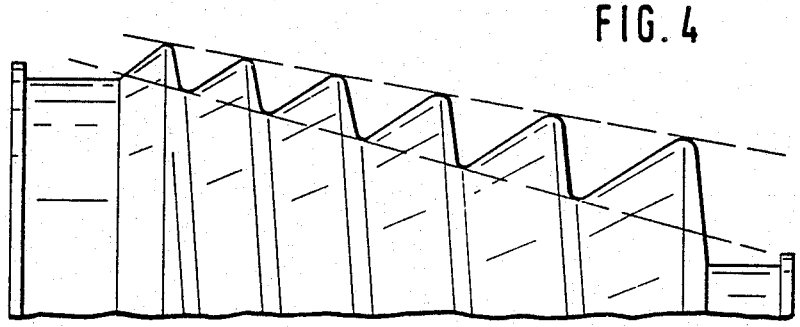
FIG. 4 is a view similar to FIG. 1 but of a third embodiment.

According to FIG. 4, here it is the left-hand zone where the amplitude is less and the frequency increases, i.e. here the left-hand zone is more flexible and more adaptable, which is desirable with other joints.

Figure 5:
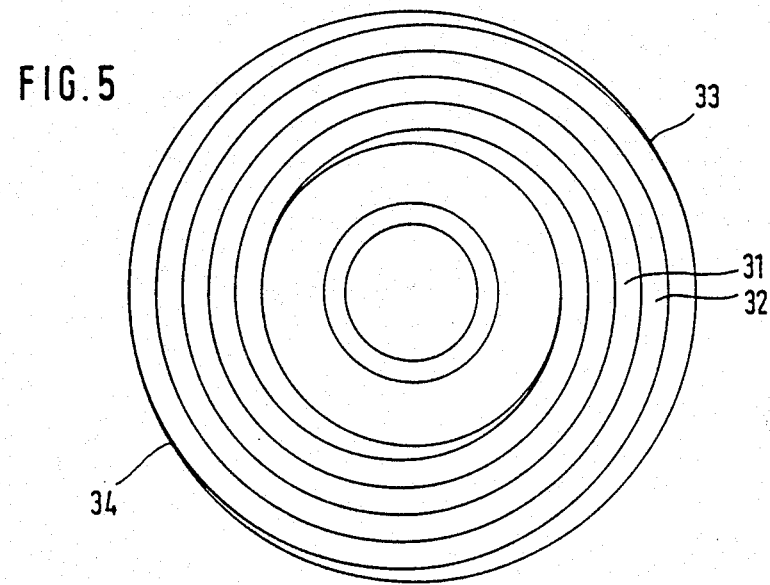
FIG. 5 is a view similar to FIG. 2 but in the case of an embodiment having two bellows ribs.

According to FIG. 5, two spirals 31, 32 are provided which start at points 33, 34 which are offset by 180 degrees in respect of each other. Where these spirals 31, 32 are concerned, either the pitch can be twice as great as in the preceding examples of embodiment, in which case there will still be the same number of bellow ribs, or a greater number of bellows ribs will be provided if the pitch is made smaller.

What is claimed is:

1. An oil and grease-proof bellows for enclosing joints on axles of motor vehicles, said bellows being produced from thin thermoplastic elastomers using hollow body production techniques, said bellows comprising a relatively small diameter first collar, a second collar of relatively large diameter, a bellows device disposed between said first and second collars, with an inner envelope and an outer envelope that decreases in diameter towards said collar of smaller diameter and the improvement wherein said bellows device has at least one bellows rib extending spirally from one of said collars to the other, the height of said bellow'srib is constant and becomes smaller only in the region of said collars, and the smaller diameter is followed by an approximately radial area and said spiral bellow'srib ends in the circumference of said radial area.

2. A bellows according to claim 1, wherein the length of said spiral bellows rib is shorter than the sum of the lengths of bellows ribs of rotationally symmetrical comparable bellows devices.

3. A bellows according to claim 1, wherein the pitch of the spiral is less than 15 degrees.

4. A bellows according to claim 1, wherein the pitch of the spiral is less than 10 degrees and greater than 2 degrees.

5. A bellows according to claim 1, wherein the pitch of the spiral is constant.

6. A bellows according to claim 1, wherein the pitch of the spiral diminishes towards said smaller diameter collar.

7. A bellows according to claim 1, wherein the pitch of the spiral diminishes towards said larger diameter collar.

8. A bellows according to claim 1, wherein said bellows device has more than one of said bellow's ribs.

* * * * *